(12) United States Patent
Kobayashi

(10) Patent No.: US 8,733,881 B2
(45) Date of Patent: May 27, 2014

(54) INKJET RECORDING METHOD

(71) Applicant: FujiFilm Corporation, Tokyo (JP)

(72) Inventor: Masaru Kobayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/773,388

(22) Filed: Feb. 21, 2013

(65) Prior Publication Data

US 2013/0162714 A1 Jun. 27, 2013

Related U.S. Application Data

(63) Continuation of application No. PCT/JP2011/068805, filed on Aug. 19, 2011.

(30) Foreign Application Priority Data

Aug. 31, 2010 (JP) .................................. 2010-193854

(51) Int. Cl.
*B41J 29/38* (2006.01)
*B41J 2/01* (2006.01)

(52) U.S. Cl.
USPC ............................................ 347/17; 347/102

(58) Field of Classification Search
USPC ................. 347/7, 17, 100, 101, 102
See application file for complete search history.

(56) References Cited

U.S. PATENT DOCUMENTS

| | | | |
|---|---|---|---|
| 8,240,839 B2 | 8/2012 | Yamanobe | |
| 2008/0238998 A1 | 10/2008 | Nakazawa et al. | |
| 2009/0315926 A1 | 12/2009 | Yamanobe | |
| 2010/0002038 A1 | 1/2010 | Onozawa et al. | |
| 2010/0231673 A1* | 9/2010 | Chiwata | 347/102 |
| 2010/0245510 A1* | 9/2010 | Ageishi | 347/102 |
| 2011/0063358 A1* | 3/2011 | Muro et al. | 347/17 |
| 2011/0199418 A1* | 8/2011 | Kaiho et al. | 347/17 |
| 2011/0261102 A1* | 10/2011 | Kurasawa et al. | 347/102 |

FOREIGN PATENT DOCUMENTS

| | | |
|---|---|---|
| JP | 2002-137375 A | 5/2002 |
| JP | 2005-138463 A | 6/2005 |
| JP | 2005-255817 A | 9/2005 |
| JP | 2008-246793 A | 10/2008 |
| JP | 2010-005815 A | 1/2010 |
| JP | 2010-012752 A | 1/2010 |

OTHER PUBLICATIONS

International Search Report; PCT/JP2011/068805; Nov. 8, 2011.
Written Opinion of the International Searching Authority; PCT/JP2011/068805; Apr. 26, 2011.

* cited by examiner

*Primary Examiner* — Kristal Feggins
(74) *Attorney, Agent, or Firm* — Studebaker & Brackett PC

(57) ABSTRACT

An inkjet recording method included a feeding step of feeding a recording medium, a jetting step of jetting aqueous ultraviolet-curable ink onto the recording medium, a humidity controlling step of controlling the amount of moisture on the surface on the recording side of the recording medium after the jetting step in such a way that a difference between the amounts of moisture on the surface on the recording side of the recording medium after the jetting step and during the feeding step becomes equal to or greater than 2 g/m² and equal to or less than 5 g/m², and a fixing step of curing and fixing, with a dose of ultraviolet light equal to or greater than 800 mJ/cm², the aqueous ultraviolet-curable ink on the recording medium in which the difference of the amounts of moisture has been controlled.

5 Claims, 4 Drawing Sheets

FIG.4A

| EXPERIMENTAL CONDITIONS | LIQUID DROPLET VOLUME [pl] | AMOUNT OF MOISTURE IN RECORDING MEDIUM [g/m²] | UV DOSE [J/cm²] | ADHESION EVALUATION RESULT |
|---|---|---|---|---|
| CONDITION 1 | 2.4 | 1 | 0.1 | NG |
| CONDITION 2 | | 1 | 0.3 | NG |
| CONDITION 3 | | 1 | 0.5 | NG |
| CONDITION 4 | | 1 | 0.8 | Poor |
| CONDITION 5 | | 1 | 1.0 | Good |
| CONDITION 6 | | 1 | 1.5 | Good |
| CONDITION 7 | | 2 | 0.1 | NG |
| CONDITION 8 | | 2 | 0.3 | NG |
| CONDITION 9 | | 2 | 0.5 | Poor |
| CONDITION 10 | | 2 | 0.8 | Good |
| CONDITION 11 | | 2 | 1.0 | Good |
| CONDITION 12 | | 2 | 1.5 | Good |
| CONDITION 13 | | 3 | 0.1 | NG |
| CONDITION 14 | | 3 | 0.3 | NG |
| CONDITION 15 | | 3 | 0.5 | Poor |
| CONDITION 16 | | 3 | 0.8 | Good |
| CONDITION 17 | | 3 | 1.0 | Good |
| CONDITION 18 | | 3 | 1.5 | Good |
| CONDITION 19 | | 5 | 0.1 | NG |
| CONDITION 20 | | 5 | 0.3 | NG |
| CONDITION 21 | | 5 | 0.5 | Good |
| CONDITION 22 | | 5 | 0.8 | Good |
| CONDITION 23 | | 5 | 1.0 | Good |
| CONDITION 24 | | 5 | 1.5 | Excellent |
| CONDITION 25 | | 7 | 0.1 | NG |
| CONDITION 26 | | 7 | 0.3 | NG |
| CONDITION 27 | | 7 | 0.5 | Good |
| CONDITION 28 | | 7 | 0.8 | Excellent |
| CONDITION 29 | | 7 | 1.0 | Excellent |
| CONDITION 30 | | 7 | 1.5 | Excellent |
| CONDITION 31 | 3.0 | 1 | 0.1 | NG |
| CONDITION 32 | | 1 | 0.3 | NG |
| CONDITION 33 | | 1 | 0.5 | NG |
| CONDITION 34 | | 1 | 0.8 | NG |
| CONDITION 35 | | 1 | 1.0 | Poor |
| CONDITION 36 | | 1 | 1.5 | Good |
| CONDITION 37 | | 2 | 0.1 | NG |
| CONDITION 38 | | 2 | 0.3 | Poor |
| CONDITION 39 | | 2 | 0.5 | Poor |
| CONDITION 40 | | 2 | 0.8 | Good |
| CONDITION 41 | | 2 | 1.0 | Good |
| CONDITION 42 | | 2 | 1.5 | Good |
| CONDITION 43 | | 3 | 0.1 | NG |
| CONDITION 44 | | 3 | 0.3 | Poor |
| CONDITION 45 | | 3 | 0.5 | Good |
| CONDITION 46 | | 3 | 0.8 | Good |
| CONDITION 47 | | 3 | 1.0 | Good |
| CONDITION 48 | | 3 | 1.5 | Good |
| CONDITION 49 | | 5 | 0.1 | NG |
| CONDITION 50 | | 5 | 0.3 | NG |
| CONDITION 51 | | 5 | 0.5 | Good |
| CONDITION 52 | | 5 | 0.8 | Good |
| CONDITION 53 | | 5 | 1.0 | Good |
| CONDITION 54 | | 5 | 1.5 | Good |
| CONDITION 55 | | 7 | 0.1 | NG |
| CONDITION 56 | | 7 | 0.3 | NG |
| CONDITION 57 | | 7 | 0.5 | Good |
| CONDITION 58 | | 7 | 0.8 | Good |
| CONDITION 59 | | 7 | 1.0 | Excellent |
| CONDITION 60 | | 7 | 1.5 | Excellent |

FIG.4B

| EXPERIMENTAL CONDITIONS | LIQUID DROPLET VOLUME [pl] | AMOUNT OF MOISTURE IN RECORDING MEDIUM [g/m²] | UV DOSE [J/cm²] | ADHESION EVALUATION RESULT |
|---|---|---|---|---|
| CONDITION 61 | 4.0 | 1 | 0.1 | Good |
| CONDITION 62 | | | 0.3 | Good |
| CONDITION 63 | | | 0.5 | Good |
| CONDITION 64 | | | 0.8 | Good |
| CONDITION 65 | | | 1.0 | Good |
| CONDITION 66 | | | 1.5 | Excellent |
| CONDITION 67 | | 2 | 0.1 | NG |
| CONDITION 68 | | | 0.3 | Good |
| CONDITION 69 | | | 0.5 | Good |
| CONDITION 70 | | | 0.8 | Good |
| CONDITION 71 | | | 1.0 | Excellent |
| CONDITION 72 | | | 1.5 | Excellent |
| CONDITION 73 | | 3 | 0.1 | NG |
| CONDITION 74 | | | 0.3 | NG |
| CONDITION 75 | | | 0.5 | Good |
| CONDITION 76 | | | 0.8 | Good |
| CONDITION 77 | | | 1.0 | Excellent |
| CONDITION 78 | | | 1.5 | Excellent |
| CONDITION 79 | | 5 | 0.1 | NG |
| CONDITION 80 | | | 0.3 | NG |
| CONDITION 81 | | | 0.5 | Poor |
| CONDITION 82 | | | 0.8 | Good |
| CONDITION 83 | | | 1.0 | Good |
| CONDITION 84 | | | 1.5 | Excellent |
| CONDITION 85 | | 7 | 0.1 | NG |
| CONDITION 86 | | | 0.3 | NG |
| CONDITION 87 | | | 0.5 | NG |
| CONDITION 88 | | | 0.8 | Good |
| CONDITION 89 | | | 1.0 | Excellent |
| CONDITION 90 | | | 1.5 | Excellent |

| EXPERIMENTAL CONDITIONS | LIQUID DROPLET VOLUME [pl] | AMOUNT OF MOISTURE IN RECORDING MEDIUM [g/m²] | UV DOSE [J/cm²] | ADHESION EVALUATION RESULT |
|---|---|---|---|---|
| CONDITION 91 | 5.0 | 1 | 0.1 | Good |
| CONDITION 92 | | | 0.3 | Good |
| CONDITION 93 | | | 0.5 | Good |
| CONDITION 94 | | | 0.8 | Good |
| CONDITION 95 | | | 1.0 | Good |
| CONDITION 96 | | | 1.5 | Excellent |
| CONDITION 97 | | 2 | 0.1 | NG |
| CONDITION 98 | | | 0.3 | Good |
| CONDITION 99 | | | 0.5 | Good |
| CONDITION 100 | | | 0.8 | Excellent |
| CONDITION 101 | | | 1.0 | Excellent |
| CONDITION 102 | | | 1.5 | Excellent |
| CONDITION 103 | | 3 | 0.1 | NG |
| CONDITION 104 | | | 0.3 | NG |
| CONDITION 105 | | | 0.5 | Good |
| CONDITION 106 | | | 0.8 | Good |
| CONDITION 107 | | | 1.0 | Excellent |
| CONDITION 108 | | | 1.5 | Excellent |
| CONDITION 109 | | 5 | 0.1 | NG |
| CONDITION 110 | | | 0.3 | NG |
| CONDITION 111 | | | 0.5 | Poor |
| CONDITION 112 | | | 0.8 | Good |
| CONDITION 113 | | | 1.0 | Good |
| CONDITION 114 | | | 1.5 | Excellent |
| CONDITION 115 | | 7 | 0.1 | NG |
| CONDITION 116 | | | 0.3 | NG |
| CONDITION 117 | | | 0.5 | NG |
| CONDITION 118 | | | 0.8 | Poor |
| CONDITION 119 | | | 1.0 | Poor |
| CONDITION 120 | | | 1.5 | Good |

INKJET RECORDING METHOD

CROSS-REFERENCE TO RELATED APPLICATIONS

This application is a continuation application of International Application No. PCT/JP/2011/068805, filed Aug. 19, 2011, which is incorporated herein by reference. Further, this application claims priority from Japanese Patent Application No. 2010-193854, filed Aug. 31, 2010, which is incorporated herein by reference.

TECHNICAL FIELD

The present invention relates to an inkjet recording method.

RELATED ART

Conventionally, in inkjet recording methods using aqueous ultraviolet-curable ink, the ink moisture penetrates the recording medium such as paper, the recording medium expands and deforms as a result of the recording medium absorbing the ink moisture, wrinkles called cockles arise, and wrinkles and curls remain even after drying, which lead to a lowering of image quality.

Thus, an apparatus having a humidity detector that detects the humidity inside a housing, a dehumidifier that dehumidifies the inside of the housing, and a controller that controls the dehumidifier in such a way that the humidity becomes a target value, and an image recording apparatus having a temperature detector that detects the temperature inside a housing, a heater that heats the inside of the hosing, and a controller that controls the heater in such a way that the temperature becomes a target value, have been disclosed (e.g., see Japanese Patent Application Laid-Open (JP-A) No. 2005-138463).

Further, for the purpose of more uniformly drying the recording medium, an apparatus that detects parameters associated with a degree of drying of the recording medium that has passed through the inside of a waveguide—such as a conveyance speed, amount of moisture, and temperature of the recording medium and humidity of the atmospheric air around the recording medium—and supplies electromagnetic waves such as microwaves to the inside of the waveguide in accordance with the parameters has been proposed (e.g., see JP-A No. 2010-012752).

Moreover, for the purpose of polymerizing cationically polymerizable ultraviolet-curable ink even in a humid environment, an apparatus that uses a heat plate or hot air blowing means to heat ink that has been landed on a printing medium in accordance with the humidity detected by printing environment humidity detecting means has been proposed (e.g., see JP-A No. 2002-137375).

SUMMARY OF INVENTION

Technical Subject

However, in the configurations described in each of the above patent documents (JP-A No. 2005-138463, JP-A No. 2010-012752, and JP-A No. 2002-137375), in a case where the amount of moisture included in the recording medium passing through the drying unit and reaching the fixing unit is not appropriate when aqueous ultraviolet-curable ink has been used, there is the potential for problems to arise in a film strength of the printed image portion, for example, and for this to lead to a lowering of image quality.

That is, in the configurations described in each of the above patent documents, there are no description relating to a range of optimum values for the amount of moisture included in the recording medium and to differences in curing efficiency between the range of the amount of moisture and ranges outside that range, and there is the problem that the amount of moisture cannot be maintained in the optimum range.

In consideration of the above circumstances, it is a subject of the present invention to provide an inkjet recording method that manages the amount of moisture in a recording medium and reliably cures ultraviolet-curable ink.

Solution to Subject

A first aspect of the present invention provides an inkjet recording method including: a feeding step of feeding a recording medium; a jetting step of jetting aqueous ultraviolet-curable ink onto the recording medium; a humidity controlling step of controlling an amount of moisture on a surface on a recording side of the recording medium after the jetting step in such a way that a difference between the amounts of moisture on the surface on the recording side of the recording medium after the jetting step and during the feeding step is in a range from 2 $g/m^2$ to 5 $g/m^2$; and a fixing step of curing and fixing, with a dose of ultraviolet light equal to or greater than 800 $mJ/cm^2$, the aqueous ultraviolet-curable ink on the recording medium after the difference between the amounts of moisture has been controlled to be within the range.

According to the above invention, by prescribing the amount of moisture in the recording medium to be in a range from 2 to 5 $g/m^2$ at the time of the fixing with the ultraviolet light at the preferred dose of 800 $mJ/cm^2$ or greater, there can be provided an inkjet recording method that reliably cures the ultraviolet-curable ink and ensures film strength.

A second aspect of the present invention provides an inkjet recording method, wherein, in the feeding step and the humidity controlling step, a paper moisture meter is used to measure the amounts of moisture on the surface on the recording side of the recording medium and to calculate the difference between the amounts of moisture.

According to the above invention, by using the paper moisture meter, accurate measurements of the amounts of moisture can be performed.

A third aspect of the present invention provides an inkjet recording method that further includes a process liquid applying step before the jetting step, wherein the inkjet recording method calculates the difference between the amounts of moisture on the basis of a type of the recording medium, an amount of process liquid applied to the recording medium, and an amount of ink jetted.

According to the above invention, by calculating the amounts of moisture from conditions, the calculation of the difference between the amounts of moisture can be performed without the need for additional equipment and at a low cost.

A fourth aspect of the present invention provides an inkjet recording method, wherein, in the fixing step, the ultraviolet light is applied to the recording medium after a temperature of the surface on the recording side of the recording medium, as measured by a radiation thermometer, has been controlled to a predetermined temperature range.

According to the above invention, by performing temperature management when curing the ink with the ultraviolet light, a lowering of the curing reaction speed caused by a low temperature and a situation in which the curing reaction becomes insufficient due to a deficiency of water caused by a high temperature can be prevented.

Further, as the ink preferred in the present invention, the inkjet recording method according to claim 5 uses aqueous ultraviolet-curable ink including at least a color material, a polymerizable monomer that is polymerized by ultraviolet light, an initiator that initiates the polymerization of the polymerizable monomer by ultraviolet light, and 50% or more of water.

Advantageous Effects of Invention

The present invention is given the above configurations, so there can be provided an inkjet recording method that manages the amount of moisture in a recording medium and reliably cures aqueous ultraviolet-curable ink.

BRIEF DESCRIPTION OF DRAWINGS

FIG. 4A is a table showing amounts of moisture in the recording medium and evaluations of ink adhesion after fixing in the image recording method pertaining to the embodiment of the present invention; and FIG. 4B is a table showing amounts of moisture in the recording medium and evaluations of ink adhesion after fixing in the image recording method pertaining to the embodiment of the present invention.

DETAILED DESCRIPTION OF THE INVENTION

An example of an embodiment pertaining to the present invention will be described below with reference to the drawings.

Figure 1:
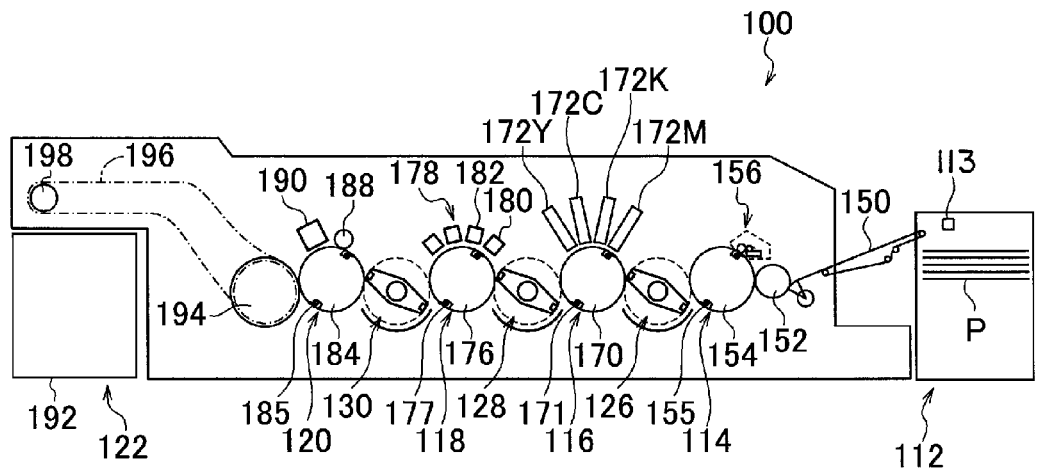
FIG. 1 is a conceptual diagram showing an image recording apparatus pertaining to an embodiment of the present invention.

FIG. 1 is a general configuration diagram showing the overall configuration of an inkjet recording apparatus that employs an inkjet recording method pertaining to an embodiment of the present invention.

The inkjet recording apparatus 100 is an impression cylinder direct-drawing inkjet recording apparatus that forms a desired color image by ejecting aqueous ultraviolet-curable ink of plural colors from inkjet heads 172M, 172K, 172C, and 172Y onto a recording surface of a recording medium P held on an impression cylinder (an image drawing drum 170) of an image drawing section 116. Further, the inkjet recording apparatus 100 is an on-demand type of image forming apparatus to which is applied a two-liquid reaction (aggregation) method that forms an image on the recording medium P by applying, before ejecting the ink, a process liquid (which includes an aggregating agent that causes components in the ink composition to aggregate) onto the recording medium P and causing the process liquid and the ink liquid to react.

That is, as shown in FIG. 1, the inkjet recording apparatus 100 is mainly configured to include a feed section 112, a process liquid application section 114, an image drawing section 116, a drying section 118, a fixing section 120, and a discharge section 122.

The feed section 112 is a mechanism that feeds the recording medium P to the process liquid application section 114, and the recording medium P, which comprises paper sheets, is stacked in the feed section 112. A feed tray 150 is disposed in the feed section 112, and the recording medium P is fed one sheet at a time from the feed tray 150 to the process liquid application section 114. In order to prevent the recording medium P from floating up, suction holes may be disposed in the outer surface of the feed tray 150, and suction means that applies negative pressure from the suction holes to thereby suck the recording medium P may be connected to the feed tray 150.

Further, a paper moisture meter 113 that measures an amount of moisture on a surface of a recording side of the fed recording medium P is disposed inside the feed section 112. The amount of moisture initially included in the fed recording medium P is measured by the paper moisture meter 113. Moreover, as mentioned later, the difference between the amount of initial moisture of the fed recording medium P and the amount of moisture in the recording medium P at the time of fixing with ultraviolet light is calculated. The amount of moisture of the recording medium P at the time of fixing is measured by a paper moisture meter 181 disposed inside the fixing section 120.

In the inkjet recording apparatus 100 of the present embodiment, plural types of recording media P with different paper types and sizes (paper sheet sizes) can be used as the recording medium P. An aspect is also possible where the feed section 112 is equipped with plural paper sheet trays (not shown in the drawings) in which various types of recording media are differentiated and accumulated and where these plural paper sheet trays are automatically switched such that the paper sheets are selectively sent to the feed tray 150. An aspect where an operator selects or replaces the paper sheet trays as needed is also possible. In the present example, paper sheets (cut paper) are used as the recording medium P, but a configuration that cuts continuous-form paper (roll paper) into the necessary size and feeds the cut paper is also possible.

The process liquid application section 114 is a mechanism that applies a process liquid to the recording surface of the recording medium P. The process liquid includes an aggregating agent that causes components in the ink composition applied by the image drawing section 116 to aggregate. An aggregating reaction with the ink is caused as a result of the process liquid and the ink contacting each other, separation of color materials and solvent in the inks is promoted, and the formation of a high-definition image becomes possible without the occurrence of bleeding, landing interference (union), or color mixing after ink landing. The process liquid can be configured using other components as needed in addition to the aggregating agent. By using the process liquid together with the ink composition, inkjet recording can be sped up, and an image whose density and resolution are high and which has superior drawability (e.g., the reproducibility of fine lines and minute sections) even when recorded at a high speed is obtained.

As shown in FIG. 1, the process liquid application section 114 has a feed cylinder 152, a process liquid drum 154, and a process liquid coating device 156. The process liquid drum 154 is a drum that holds and rotationally conveys the recording medium P. The process liquid drum 154 is equipped with claw-shaped holding means (grippers) 155 on its outer peripheral surface and can hold the leading end of the recording medium P by inserting the recording medium P between the claws of the holding means 155 and the peripheral surface of the process liquid drum 154. Suction holes may be disposed in the outer peripheral surface of the process liquid drum 154, and suction means that uses negative pressure to suck the recording medium P from the suction holes may be connected to the process liquid drum 154. Because of this, the recording medium P can be held tightly on the peripheral surface of the process liquid drum 154.

The process liquid coating device 156 is disposed on an outer side of the process liquid drum 154 in such a way as to oppose the peripheral surface of the process liquid drum 154. The process liquid is coated on the recording surface of the recording paper P by the process liquid coating device 156.

The recording medium P to which the process liquid has been applied by the process liquid application section 114 is transferred from the process liquid drum 154 via an intermediate conveyance section 126 (first transfer cylinder conveying means) to the image drawing drum 170 of the image drawing section 116.

The image drawing section 116 is equipped with the image drawing drum 170 and the inkjet heads 172M, 172K, 172C, and 172Y. Although it is not shown in FIG. 1, a paper sheet holding roller for removing wrinkles in the recording medium P may be placed on an upstream side of the inkjet heads 172M, 172K, 172C, and 172Y with respect to the image drawing drum 170.

Like the process liquid drum 154, the image drawing drum 170 is equipped with claw-shaped holding means (grippers) 171 on its outer peripheral surface and holds and fixes the leading end portion of the recording medium. Further, the image drawing drum 170 has plural suction holes in its outer peripheral surface and uses negative pressure to suck the recording medium P onto the outer peripheral surface of the image drawing drum 170. Because of this, contact between the paper sheet P and the inkjet heads 172 caused by floating of the paper sheet is avoided and paper sheet jams are prevented. Further, image unevenness caused by fluctuations in the clearance between the paper sheet P and the inkjet heads 172 is prevented.

The recording medium P that has been fixed to the image drawing drum 170 in this way is conveyed with its recording surface facing outward, and aqueous ultraviolet-curable ink is ejected onto the recording surface from the inkjet heads 172M, 172K, 172C, and 172Y.

The inkjet heads 172M, 172K, 172C, and 172Y are each full-line inkjet recording heads having a length corresponding to the maximum width of an image formation region on the recording medium P. Nozzle rows, in which plural nozzles for jetting ink are arrayed over the entire width of the image formation region, are formed in the ink jetting surfaces of the inkjet heads 172M, 172K, 172C, and 172Y. The inkjet heads 172M, 172K, 172C, and 172Y are installed in such a way as to extend in a direction orthogonal to the conveyance direction of the recording medium P (the rotational direction of the image drawing drum 170).

From the inkjet heads 172M, 172K, 172C, and 172Y, liquid droplets of the corresponding color ink are jetted toward the recording surface of the recording medium P tightly held on the image drawing drum 170. Because of this, the ink contacts the process liquid that has been applied to the recording surface beforehand by the process liquid application section 114, the color materials (pigments) dispersed in the ink aggregate, and a color material aggregation is formed. Because of this, color material flow on the recording medium P is prevented and an image is formed on the recording surface of the recording medium P.

In the present example, a CMYK standard color (four-color) configuration is exemplified, but the combination of the ink colors and the number of colors is not limited to the present embodiment, and light inks, dark inks, and special color inks may be added as needed. For example, a configuration that adds inkjet heads that jet light inks such as light cyan and light magenta is also possible, and the order in which the color heads are arranged is also not particularly limited.

The image drawing section 116 configured as described above can perform image drawing in a single pass with respect to the recording medium P. Because of this, high-speed recording and high-speed output are possible, and productivity can be raised.

The recording medium P on which the image has been formed by the image drawing section 116 is transferred from the image drawing drum 170 via an intermediate conveyance section 128 (second transfer cylinder conveying means) to a drying drum 176 of the drying section 118.

The drying section 118 is a mechanism that dries moisture included in the solvent that has been separated by the color material aggregating action; as shown in FIG. 1, the drying section 118 is equipped with the drying drum 176 and a solvent drying device 178. Like the process liquid drum 154, the drying drum 176 is equipped with claw-shaped holding means (grippers) 177 on its outer peripheral surface. The drying drum 176 uses the holding means 177 to hold the leading end of the recording medium, has suction holes (not shown in the drawings) in the drum outer peripheral surface, and can use negative pressure to suck the recording medium P onto the drying drum 176. Further, air blowing means 180 (suction assisting means) and the solvent drying device 178 are disposed in such a way as to oppose the outer peripheral surface of the drying drum 176.

The air blowing means 180 is for assisting the suction of the recording medium P onto the drying drum 176. The air blowing means 180 applies air obliquely toward the width direction end portion sides of the recording medium P, and the recording medium P whose leading end is held by the holding means 177 is reliably sucked from its distal end side toward its trailing end side without the occurrence of wrinkles.

The solvent drying device 178 is placed in a position opposing the outer peripheral surface of the drying drum 176 and is configured by hot air drying means 182 in which plural combinations of an IR heater or the like and a fan are placed. Various drying conditions can be realized by appropriately controlling the temperature and air volume of the hot air blown toward the recording medium P from hot air blowing nozzles of the hot air drying means 182. The recording medium P is conveyed with its recording surface facing outward while being sucked and restrained on the outer peripheral surface of the drying drum 176, and a drying treatment resulting from the IR heaters and the warm air blowing nozzles is performed with respect to the recording surface.

Further, suction holes are disposed in the outer peripheral surface of the drying drum 176, and the drying drum 176 has suction means that uses negative pressure to perform suction from the suction holes. Because of this, the recording medium P can be tightly held on the peripheral surface of the drying drum 176. Further, the recording medium P can be restrained on the drying drum 176 by performing negative pressure suction, so cockles in the recording medium P can be prevented.

The recording medium P on which the drying treatment has been performed by the drying section 118 is transferred from the drying drum 176 via an intermediate conveyance section 130 (third transfer cylinder conveying means) to a fixing drum 184 of the fixing section 120.

The fixing section 120 is configured by the fixing drum 184, a pressure roller 188 (smoothing means), and ultraviolet light sources 190 (ultraviolet light applying means). Like the process liquid drum 154, the fixing drum 184 is equipped with claw-shaped holding means (grippers) 185 on its outer peripheral surface and can use the holding means 185 to hold the leading end of the recording medium P.

The recording medium P is conveyed with its recording surface facing outward by the rotation of the fixing drum 184, a smoothing treatment resulting from the pressure roller 188 is performed with respect to the recording surface, and thereafter curing/fixing resulting from the application of ultraviolet light from the ultraviolet light sources 190 is performed.

The pressure roller 188 smooths the recording medium P by applying pressure to the recording medium P on which the ink has been dried. Further, the ultraviolet light sources 190 fix the ink by applying ultraviolet light to the image that has been formed by the aqueous ultraviolet-curable ink jetted onto the recording medium P.

An inline sensor that inspects the image that has been formed on the recording medium P may be disposed in such a way as to oppose the outer peripheral surface of the fixing drum 184. The inline sensor is measuring means for measuring a check pattern, the amount of moisture, the surface temperature, and the glossiness in regard to the image that has been fixed on the recording medium P, and a CCD line sensor, for example, can be suitably used.

The discharge section 122 is disposed following the fixing section 120. A discharge unit 192 is installed in the discharge section 122. A transfer cylinder 194 and a conveyance chain 196 are disposed between the fixing drum 184 of the fixing section 120 and the discharge unit 192. The conveyance chain 196 is trained around a tension roller 198. The recording medium P that has passed the fixing drum 184 is sent via the transfer cylinder 194 to the conveyance chain 196 and is transferred from the conveyance chain 196 to the discharge unit 192.

Further, although it is not shown in FIG. 1, the inkjet recording apparatus 100 of the present example may, in addition to the above-described configurations, be equipped with means for supplying the process liquid to the process liquid application section 114—such as ink storage/filling units that supply the ink to the inkjet heads 172M, 172K, 172C, and 172Y and means for supplying the process liquid to the process liquid application section 114—and may be equipped with head maintenance units that clean the inkjet heads 172M, 172K, 172C, and 172Y (nozzle surface wiping, purging, nozzle suction, etc.), position detection sensors that detect the position of the recording medium P on the paper sheet conveyance path, and temperature sensors that detect the temperature in each section of the apparatus.

<Aqueous Ultraviolet-Curable Ink>

Here, the ink (aqueous ultraviolet-curable ink) used in the present invention will be described. The aqueous ultraviolet-curable ink includes a pigment, polymer particles, and a water-soluble polymerizable compound that is polymerized by an active energy ray. Because of this, the ink can be cured by irradiating the ink with ultraviolet light, and the ink has superior abrasion resistance and high film strength.

The ink composition in the present invention includes a pigment and can be configured further using a dispersant, a surfactant, and other components as needed. The ink composition contains at least one kind of pigment as the color material component. There are no particular restrictions on the pigment, and the pigment can be appropriately selected in accordance with the purpose; for example, the pigment may be an organic pigment or an inorganic pigment. In terms of ink colorability, the pigment is preferably a pigment that is virtually insoluble or sparingly soluble in water. Further, the pigment is preferably a water-dispersible pigment where at least part of its surface is covered by a polymer dispersant.

The ink composition of the present invention can contain at least one kind of dispersant. The dispersant for the pigment may be a polymer dispersant or a low molecular weight surfactant dispersant. Further, the polymer dispersant may be a water-soluble dispersant or a non-water-soluble dispersant.

The weight average molecular weight of the polymer dispersant is preferably 3,000 to 100,000, more preferably 5,000 to 50,000, even more preferably 5,000 to 40,000, and particularly preferably 10,000 to 40,000.

The acid value of the polymer dispersant is preferably equal to or less than 100 mg KOH/g from the standpoint of achieving good aggregability upon contact with the process liquid. Moreover, the acid value is more preferably 25 to 100 mg KOH/g, even more preferably 25 to 80 mg KOH/g, and particularly preferably 30 to 65 mg KOH/g. When the acid value of the polymer dispersant is equal to or greater than 25, the stability of self-dispersal is good.

From the standpoint of self-dispersal and aggregation speed upon contact with the process liquid, the polymer dispersant preferably includes a polymer having a carboxyl group and more preferably includes a polymer having a carboxyl group and an acid value of 25 to 80 mg KOH/g.

In the present embodiment, from the standpoint of the light resistance and quality of the image, the ink composition preferably includes a pigment and a dispersant, more preferably includes an organic pigment and a polymer dispersant, and particularly preferably includes an organic pigment and a polymer dispersant that includes a carboxyl group. Further, the pigment is preferably covered by a polymer dispersant having a carboxyl group from the standpoint of aggregability and water-insoluble. Moreover, from the standpoint of aggregability, the acid value of the particles of a later-described self-dispersing polymer is preferably smaller than the acid value of the polymer dispersant.

The average particle size of the pigment is preferably 10 to 200 nm, more preferably 10 to 150 nm, and even more preferably 10 to 100 nm. When the average particle size is equal to or less than 200 nm, color reproducibility is good and droplet ejection characteristics when ejecting droplets by the inkjet method are good, and when the average particle size is equal to or less than 100 nm, light resistance is good. Further, in relation to the particle size distribution of the color material, there are no particular restrictions, and the particle size distribution may be with a wide range of particle size or with monodisperse of a particle size. Further, two or more kinds of color materials having a monodisperse particle size distribution may also be mixed together and used.

The average particle size and the particle size distribution of the pigment particles are found by measuring the volume average particle size by dynamic light scattering using the Nanotrac particle size distribution analyzer UPA-EX150 (manufactured by Nikkiso Co., Ltd.).

One kind of pigment may be used alone or two or more kinds of pigments may be combined and used. From the standpoint of image density, the content of the pigment in the ink composition is preferably 1 to 25% by mass, more preferably 2 to 20% by mass, even more preferably 5 to 20% by mass, and particularly preferably 5 to 15% by mass with respect to the ink composition.

The ink composition in the present invention can contain at least one kind of polymer particle. The polymer particles have the function of fixing the ink composition by destabilizing dispersion upon contact with the later-described process liquid or the region where the process liquid has been dried, causing aggregation, and increasing the viscosity of the ink, and the polymer particles can further improve the fixability of the ink composition to the recording medium and the abrasion resistance of the image.

In order to react with the aggregating agent, polymer particles having an anionic surface charge are used, and widely commonly known latex is used to the extent that sufficient reactivity and jetting stability are obtained, but using self-dispersing polymer particles is particularly preferred.

The ink composition in the present invention preferably contains at least one kind of self-dispersing polymer particle as the polymer particles. The self-dispersing polymer particles have the function of fixing the ink composition by destabilizing dispersion, being aggregated, and increasing the viscosity of the ink upon contact with the later-described process liquid or the region where the process liquid has been dried so as to improve the fixability of the ink composition to the recording medium and the abrasion resistance of the image. Further, the self-dispersing polymer particles are resin particles, which are preferred from the standpoint of jetting stability and the liquid stability (particularly dispersion stability) of the system including the pigment.

"Self-dispersing polymer particles" means particles of a water-insoluble polymer that does not contain a free emulsifier and which can be obtained as a dispersion in an aqueous medium due to the functional group (particularly an acid group or salt thereof) that the polymer itself has, without the presence of another surfactant.

The acid value of the self-dispersing polymer in the present invention is preferably equal to or less than 50 mg KOH/g from the standpoint of achieving good aggregability upon contact with the process liquid. Moreover, the acid value is more preferably 25 to 50 mg KOH/g and even more preferably 30 to 50 mg KOH/g. When the acid value of the self-dispersing polymer is equal to or greater than 25 mg KOH/g, the stability of self-dispersal is good.

From the standpoint of self-dispersal and aggregation speed upon contact with the process liquid, the particles of the self-dispersing polymer in the present invention preferably include a polymer having a carboxyl group, more preferably include a polymer having a carboxyl group and an acid value of 25 to 50 mg KOH/g, and even more preferably include a polymer having a carboxyl group and an acid value of 30 to 50 mg KOH/g.

As for the molecular weight of the water-insoluble polymer configuring the particles of the self-dispersing polymer, the weight average molecular weight is preferably 3,000 to 200,000, more preferably 5,000 to 150,000, and even more preferably 10,000 to 100,000. By making the weight average molecular weight equal to or greater than 3,000, the amount of the water-soluble component can be effectively suppressed. Further, by making the weight average molecular weight equal to or less than 200,000, self-dispersal stability can be enhanced.

The weight average molecular weight is measured by gel permeation chromatography (GPC). GPC is performed using the HLC-8220 GPC (made by Tosoh Corporation), using three columns of TSKgeL Super HZM-H, TSKgeL Super HZ4000, and TSKgeL Super HZ2000 (made by Tosoh Corporation, 4.6 mm ID×15 cm), and using an eluent of THF (tetrahydrofuran). Further, as for the conditions, the sample density is 0.35 by mass, the flow rate is 0.35 ml/min., the sample injection amount is 10 µl, and the measurement temperature is 40° C., and GPC is performed using an IR detector.

Further, a calibration curve is created from eight samples manufactured by Tosoh Corporation: "standard sample TSK standard, polystyrene", "F-40", "F-20", "F-4", "F-1", "A-5000", "A-2500", "A-1000", and "n-propyl benzene".

As for the average particle size of the particles of the self-dispersing polymer, the volume average particle size is preferably in the range of 10 nm to 400 nm, more preferably in the range of 10 to 200 nm, and even more preferably in the range of 10 to 100 nm. When the volume average particle size is equal to or greater than 10 nm, manufacturing suitability improves, and when the volume average particle size is equal to or less than 1 µm, storage stability improves.

The average particle size and the particle size distribution of the particles of the self-dispersing polymer are found by measuring the volume average particle size by dynamic light scattering using the Nanotrac particle size distribution analyzer UPA-EX150 (manufactured by Nikkiso Co., Ltd.).

One type of self-dispersing polymer particle can be used alone, or two or more types of self-dispersing polymer particles can be mixed together and used. From the standpoint of aggregation speed and image glossiness, the content of the particles of the self-dispersing polymer in the ink composition is preferably 1 to 30% by mass and more preferably 5 to 15% by mass with respect to the ink composition.

Further, from the standpoint of the abrasion resistance of the image, the content ratio between the pigment and the particles of the self-dispersing polymer in the ink composition (e.g., water-insoluble pigment particles/particles of self-dispersing polymer) is preferably 1/0.5 to 1/10 and more preferably 1/1 to 1/4.

The ink composition in the present invention can contain at least one type of water-soluble polymerizable compound that is polymerized by an active energy ray. The polymerizable compound is preferably a non-ionic or cationic polymerizable compound in terms of not hindering the reaction between the aggregating agent and the pigment and polymer particles. Further, "water-soluble" means that a fixed concentration or more is able to be dissolved in water, and it suffices for the polymerizable compound to be able to be dissolved (preferably uniformly) in the aqueous ink.

Further, the polymerizable compound may also be a polymerizable compound whose solubility is increased by adding a water-soluble organic solvent and which dissolves (preferably uniformly) in the ink. Specifically, the solubility of the polymerizable compound with respect to water is preferably equal to or greater than 10% by mass and more preferably equal to or greater than 15% by mass.

The polymerizable compound in the present invention is preferably a polyfunctional monomer from the standpoint of being able to enhance abrasion resistance, and the polymerizable compound is preferably a bifunctional to hexafunctional monomer and is preferably a bifunctional to quadrifunctional monomer from the standpoint of achieving a balance between solubility and abrasion resistance. The ink composition can contain one type of polymerizable compound alone or can contain a combination of two or more types of polymerizable compounds.

The content of the polymerizable compound in the ink composition is preferably 30 to 300% by mass and more preferably 50 to 200% by mass with respect to the combined total solid content of the pigment and the particles of the self-dispersing polymer. When the content of the polymerizable compound is equal to or greater than 30% by mass, image strength improves more and the image has superior abrasion resistance, and when the content of the polymerizable compound is equal to or less than 300% by mass, this is advantageous in terms of pile height.

At least one of the ink composition and the process liquid further includes an initiator that initiates the polymerization of the polymerizable compound by an active energy ray.

The ink composition in the present invention can contain, with or without being contained in the process liquid, at least one type of initiator that initiates the polymerization of the polymerizable compound by an active energy ray. One type of photopolymerization initiator can be used alone, or two or more types of photopolymerization initiators can be mixed together and used, and the photopolymerization initiator can be used together with a sensitizer.

For the initiator, a compound that can initiate the polymerization reaction by an active energy can be appropriately selected and contained; for example, an initiator that generates an active species (radical, acid, salt, base, etc.) upon exposure to radiation or light or an electron beam (e.g., a photopolymerization initiator) can be used.

In a case where the ink composition contains an initiator, the content of the initiator in the ink composition is preferably 1 to 40% by mass and more preferably 5 to 30% by mass with respect to the polymerizable compound. When the content of the initiator is equal to or greater than 1% by mass, the abrasion resistance of the image improves more, which is advantageous for high-speed recording, and when the content of the initiator is equal to or less than 40% by mass, this is advantageous in terms of jetting stability.

The ink composition in the present invention can contain at least one type of water-soluble organic solvent. The water-soluble organic solvent can obtain an anti-drying, wetting, or penetration enhancing effect. For anti-drying, the water-soluble organic solvent is used as an anti-drying agent that prevents a situation where the ink adheres to and dries in the ink jetting ports of the jetting nozzles such that aggregates form and clog the ink jetting ports, and for anti-drying and wetting, a water-soluble organic solvent whose vapor pressure is lower than that of water is preferred. Further, for penetration enhancement, the water-soluble organic solvent can be used as a penetration enhancer that enhances the penetration of the ink into the paper.

One type of anti-drying agent may be used alone, or two or more types of anti-drying agents may be used together. The content of the anti-drying agent is preferably in the range of 10 to 50% by mass in the ink composition.

One type of penetration enhancer may be used alone, or two or more types of penetration enhancers may be used together. The content of the penetration enhancer is preferably in the range of 5 to 30% by mass in the ink composition. Further, the penetration enhancer is preferably used in the range of an amount that does not cause image bleeding or print-through.

The ink composition contains water, but there are no particular restrictions on the amount of the water. The preferred content of water is 10 to 99% by pass, more preferably 30 to 80% by mass, and even more preferably 50 to 70% by mass.

The ink composition in the present invention can be configured using other additives in addition to the components described above. Example of other additives include publicly known additives such as anti-drying agents (wetting agents), anti-fading agents, emulsion stabilizers, penetration enhancers, UV absorbers, preservatives, antifungal agents, pH modifiers, surface tension modifiers, defoamers, viscosity modifiers, dispersants, dispersion stabilizers, corrosion inhibitors, and chelating agents.

<Details of Each Section>

Figure 2:
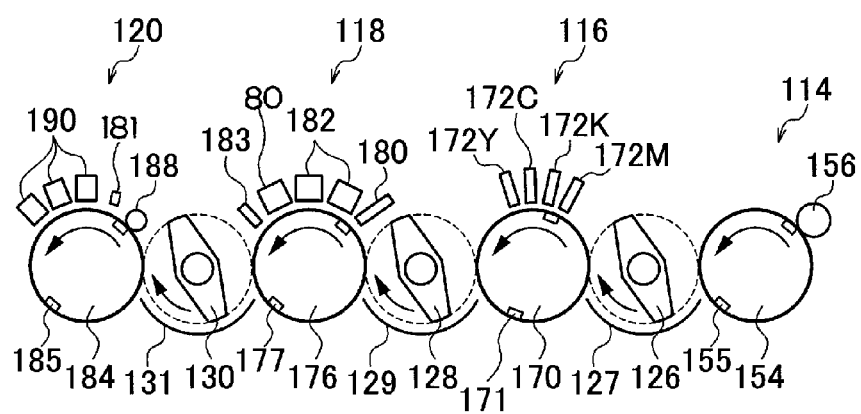
FIG. 2 is a conceptual diagram showing main sections of the image recording apparatus pertaining to the embodiment of the present invention.

FIG. 2 shows an enlarged view of the process liquid application section 114, the image drawing section 116, the drying section 118, and the fixing section 120, which are the main sections of the inkjet recording apparatus 100 of the present embodiment, and the inkjet recording apparatus pertaining to the present invention will be described in greater detail.

As shown in FIG. 2, in the main sections of the inkjet recording apparatus, the process liquid drum 154, the intermediate conveyance section 126 (first transfer cylinder conveying means), the image drawing drum 170, the intermediate conveyance section 128 (second transfer cylinder conveying means), the drying drum 176, the intermediate conveyance section 130 (third transfer cylinder conveying means), and the fixing drum 184 are placed side by side. The recording medium P is conveyed by the respective drums, and as the recording medium P is conveyed, process liquid application, image drawing, drying, and fixing (curing) are performed in order.

The intermediate conveyance sections (the intermediate conveyance sections 126, 128, and 130) are equipped with guide members 127, 129, and 131 having ribs, respectively; holding claws (not shown in the drawings) on the leading end portions of arms which extends to 180° opposing directions with respect to rotating shafts grip the leading end portion of the recording medium P and rotate about the rotating shafts. The intermediate conveyance sections are configured to convey the recording medium P, in such a way that the reverse surface side of the recording surface becomes convex, along the respective guide members (127, 129, and 131) in a state in which the trailing end portion of the recording medium P is free.

The intermediate conveyance sections 126, 128, and 130 may be configured to use chain grippers to grip the recording medium P and convey the recording medium P in such a way that the reverse surface side is convex.

The inkjet recording apparatus 100 of the present embodiment records an image on the recording surface of the recording medium P; there are no particular restrictions on the recording medium P, and general printing paper mainly consisting of cellulose—such as so-called wood-free paper, coated paper, and art paper—used in general offset printing and so forth can be used. When general printing paper mainly consisting of cellulose is used in image recording of a common inkjet method using aqueous ink, the absorption and drying of the ink is relatively slow, color material migration tends to occur after droplet ejection, and image quality tends to become lower. But in the inkjet recording apparatus 100 of the present embodiment, color material migration is suppressed so that high-definition image recording having superior color density and hue is possible.

Among recording media, so-called coated paper used in general offset printing and so forth is preferred. Coated paper is paper in which a coating layer is disposed on the surface of wood-free paper or alkaline paper that mainly consists of cellulose by applying a coating material to the surface, and to which a surface treatment is generally not administered. With coated paper, problems in terms of quality—such as the gloss of the image and abrasion resistance—tend to arise in image formation resulting from jetting ordinary aqueous ink, but in the inkjet recording apparatus 100 of the present embodiment, gloss unevenness is suppressed and an image with good glossiness and abrasion resistance can be obtained. Further, using coated paper having stencil paper and a coating layer including an inorganic pigment is preferred, and using coated paper having stencil paper and a coating layer including kaolin and/or calcium bicarbonate is more preferred. Specifically, art paper, coated paper, lightweight coated paper, or lightly coated paper is more preferred.

As mentioned before, the process liquid application section 114 applies a process liquid to the recording surface of the recording paper P.

The film thickness of the process liquid coating applied to the recording surface by the process liquid coating device 156 is preferably sufficiently smaller than the liquid droplet diameter of the ink ejected from the inkjet heads 172M, 172K, 172C, and 172Y of the image drawing section 116. For example, when the droplet ejection amount of the ink is 2 pl (picoliters), the average diameter of the liquid droplets is 15.6 μm. At this time, in a case where the film thickness of the process liquid is large, the ink dots do not contact the surface of the recording medium P and float in the process liquid. Thus, making the film thickness of the process liquid equal to or less than 3 μm is preferred in order to obtain a landing dot diameter equal to or greater than 30 μm when the droplet ejection amount of the ink is 2 pl.

The process liquid coating device 156 is mainly configured by a process liquid container, a metering roller, and a coating roller (none of which is shown in the drawings). The process liquid is stored in the process liquid container, and part of the metering roller is immersed in the process liquid. A metal roller, or an anilox roller in which numerous cells are regularly formed in a fixed number of lines in the peripheral surface of a metal roller whose surface has been coated with a ceramic coating, is suitably used as the metering roller. Iron, stainless steel, or the like is used as the material of the metal roller. In a case where iron is used as the material, the surface of the roller may be plated with chrome or the like in order to improve the hydrophilicity of the surface, improve wear resistance, and improve rust prevention. As for the cell structure of the anilox roller, for example, a structure having a number of lines equal to or greater than 150 lines and equal to or less than 400 lines, a cell depth equal to or greater than 20 μm and equal to or less than 75 μm, and a cell capacity equal to or greater than 30 $cm^3/m^2$ and equal to or less than 60 $cm^3/m^2$ can be suitably used. The diameter of the metering roller is formed to be equal to or greater than 20 mm and equal to or less than 100 mm, for example.

The metering roller is supported in such a way that it may freely rotate, is coupled to an unillustrated motor, and is driven to rotate at a fixed speed. Consequently, the process liquid in the process liquid container can be adhered to the surface of the metering roller, and the process liquid can be transferred onto the surface of the coating roller. The rotational direction of the metering roller is the same direction as that of the coating roller, and the peripheral speed of the roller outer periphery may be the same as that of the coating roller or a difference in speed may be formed. In a case where a difference in speed is formed, the peripheral speed of the metering roller is preferably 80% to 140% of the peripheral speed of coating roller. By controlling the peripheral speeds of the coating roller and the metering roller, the transfer rate of the process liquid from the metering roller to the coating roller can be controlled, and the film thickness of the coating on the recording medium P can be controlled.

A doctor blade for metering is disposed so as to be in contact with the surface of the metering roller. The doctor blade is placed on the upstream side—in the rotational direction of the metering roller—of the position at which the metering roller and the coating roller are in contact with each other, and the doctor blade can scrape off and meter the coating liquid on the surface of the metering roller. Because of this, the coating liquid that has been metered by the doctor blade can be supplied to the coating roller.

A rubber roller having on its surface a rubber layer of EPDM, silicon, or the like is suitably used as the coating roller. The coating roller is supported in such a way that it may freely rotate, is coupled to an unillustrated motor, and is driven to rotate at a fixed speed. The rotational direction of the coating roller is the same direction as that of the process liquid drum 154, and the peripheral speed of the roller outer periphery is the same speed as that of the process liquid drum 154. Because of this, a coat of the process liquid that has been transferred from the metering roller to the coating roller is applied to the recording medium P held on the process liquid drum 154.

Since the process liquid coating device 156 applies the process liquid coating with a roller, the process liquid coating device 156 can apply the process liquid to the recording medium P uniformly and in a small coating amount. Further, it is preferred that the process liquid coating device 156 be configured to bring the coating roller into contact with and to move the roller away from each recording medium in order to ensure that the conveyance cylinder (the process liquid drum 154) does not become dirty. The process liquid drum 154 conveys the recording medium P with holding claws that hold the leading end of the recording medium P. Because of this, high-speed conveyance of the recording medium P is possible, and the occurrence of paper sheet conveyance jams can be reduced.

An IR heater and a warm air blowing nozzle may be disposed on the outer periphery of the process liquid drum 154 in such a way as to oppose the peripheral surface of the process liquid drum 156 to dry the process liquid coating that has been applied to the recording medium P. In a case where an IR heater and a warm air blowing nozzle are disposed, the IR heater is controlled at a high temperature (e.g., 180° C.), and the warm air blowing nozzle is configured to blow high-temperature (e.g., 70° C.) warm air toward the recording medium P with a fixed air volume (e.g., 9 $m^3$/min.). Because of the heat resulting from the IR heater and the warm air blowing nozzle, the moisture in the solvent of the process liquid evaporates and a thin-film layer of the process liquid is formed on the recording surface of the recording medium P. By forming the process liquid in a thin film in this way, the dots of the ink ejected by the image drawing section 116 contact the recording surface of the recording medium P, the necessary dot diameter is obtained, color material aggregation occurs as a result of the ink reacting with the process liquid components made into a thin film, and it is easy to obtain the action of fixing the ink to the recording surface of the recording medium P. The process liquid drum 154 may be controlled to a predetermined temperature (e.g., 50° C.).

Further, the process liquid includes an aggregating agent that causes the components in the ink composition applied by the image drawing section 116 to aggregate.

The aggregating agent may be a compound that can change the pH of the ink composition, or may be a polyvalent metal salt, or may be a polyallylamine. In the present embodiment, from the standpoint of the aggregability of the ink composition, a compound that can change the pH of the ink composition is preferred, and a compound that can lower the pH of the ink composition is more preferred. Examples of suitable compounds that can lower the pH of the ink composition include acidic substances whose solubility in water is high (phosphoric acid, oxalic acid, malonic acid, citric acid, or derivatives of these compounds, or salts of these).

In this way, as the aggregating agent, an acidic substance whose solubility in water is high is preferred, and in terms of enhancing aggregability and fixing all the ink, an organic acid is preferred and an organic acid with an acid number equal to or greater than 2 is more preferred. Moreover, an acidic substance with an acid number equal to or greater than 2 and equal to or less than 3 is particularly preferred. As the organic acid with an acid number equal to or greater than 2, an organic acid whose first pKa is equal to or less than 3.5 is preferred, and more preferred is an organic acid whose first pKa is equal to or less than 3.0; specifically, suitable examples include phosphoric acid, oxalic acid, malonic acid, and citric acid.

In the aggregating agent, one kind of acidic substance may be used alone, or two or more kinds of acidic substances may be used together. Because of this, aggregability can be enhanced and all the ink can be fixed. The content, in the process liquid, of the aggregating agent that causes the ink composition to aggregate is preferably in the range of 1 to 50% by mass, more preferably in the range of 3 to 45% by mass, and even more preferably in the range of 5 to 40% by mass. Further, it is preferred that the pH (25° C.) of the ink composition be equal to or greater than 8.0 and that the pH (25° C.) of the process liquid be in the range of 0.5 to 4. Because of this, image density, resolution, and an increase in the speed of inkjet recording can be achieved.

Further, the process liquid can contain other additives. Example of the additives include publicly known additives such as anti-drying agents (wetting agents), anti-fading agents, emulsion stabilizers, penetration enhancers, UV absorbers, preservatives, antifungal agents, pH modifiers, surface tension modifiers, defoamers, viscosity modifiers, dispersants, dispersion stabilizers, corrosion inhibitors, and chelating agents.

As described above, in the present embodiment, a configuration applying the method of using a roller to coat the process liquid is exemplified, but the application of the process liquid is not limited to coating and can also be performed by applying publicly known methods such as ink jetting or immersion. The coating can be performed by publicly known coating methods using a bar coater, an extrusion die coater, an air doctor coater, a blade coater, a rod coater, a knife coater, a squeeze coater, a reverse roll coater, and so forth.

The process liquid applying step may be disposed before or after the ink applying step using the ink composition. In the present embodiment, an aspect where the ink applying step is disposed after the process liquid has been applied in the process liquid applying step is preferred. Specifically, an aspect where the process liquid for causing the pigment and/or the particles of the self-dispersing polymer in the ink composition to aggregate beforehand is applied to the recording medium P before the ink composition is applied to the recording medium P and where the ink composition is applied in such a way as to contact the process liquid that has been applied to the recording medium P to thereby form an image is preferred. Because of this, inkjet recording can be sped up, and an image whose density and resolution are high even when recorded at a high speed can be obtained.

Further, there are no particular restrictions on the amount of the process liquid that is applied as long as the process liquid is capable of causing the ink composition to aggregate, but preferably the amount is set so that the applied amount of the aggregating agent is equal to or greater than 0.1 g/m². An amount by which the applied amount of the aggregating agent is 0.2 to 0.7 g/m² is preferred. When the applied amount of the aggregating agent is equal to or greater than 0.1 g/m², good high-speed aggregability is maintained in accordance with a variety of uses of the ink composition. Further, it is preferred that the applied amount of the aggregating agent be equal to or less than 0.7 g/m² in terms of not adversely affecting (changing gloss, etc.) the nature of the surface of the recording medium to which the aggregating agent has been applied.

In the process liquid application section 114, the process liquid coating device 156 meters and applies the process liquid to the recording medium P while the holding means 155 disposed on the outer peripheral surface of the process liquid drum 154 holds and conveys the leading end portion of the recording medium P.

The recording medium P to which the process liquid has been applied by the process liquid application section 114 is conveyed to the subsequent image drawing section 116 by the intermediate conveyance section (first transfer cylinder conveying means) 126. The recording medium P is conveyed in such a way that its leading end portion is held by the holding claws (not shown in the drawings) of the intermediate conveyance section 126, its recording surface faces inward, and its reverse surface side has a convex shape along the guide member 127.

Further, the intermediate conveyance section 126 may be given a configuration that has hot air drying means (not shown in the drawings) inside (in the vicinity of the rotating shaft), applies hot air to the recording surface (front surface) side of the recording medium P facing inward during conveyance, and dries the process liquid that has been applied to the front surface. Because of this, when the ink has been ejected onto the recording medium P in the image drawing section 116, migration of the ink that has landed on the recording medium at the time of ink adhesion is prevented.

The image drawing drum 170 of the image drawing section 116 uses the holding means 171 disposed on the outer peripheral surface of the image drawing drum 170 to hold the leading end portion of the recording medium P that has been conveyed thereto by the intermediate conveyance section 126. The image drawing drum 170 also uses the suction holes (not shown in the drawings) disposed in the outer peripheral surface of the image drawing drum 170 to suck and fix the recording medium P on the outer peripheral surface of the image drawing drum 170 and convey the recording medium P. Additionally, the aqueous ultraviolet-curable ink is ejected from the inkjet heads 172M, 172K, 172C, and 127Y toward the front surface (recording surface)—to which the process liquid is applied—of the recording medium P fixed on the outer peripheral surface of the image drawing drum 170.

<Image Drawing Section>

In the image drawing section 116 shown in FIG. 2, liquid droplets of the corresponding color ink are jetted from the inkjet heads 172M, 172K, 172C, and 172Y toward the recording surface of the recording medium P tightly held on the image drawing drum 170. Because of this, the ink contacts the process liquid that has been applied to the recording surface of the recording medium P beforehand by the process liquid application section 114, the color materials (pigments) dispersed in the ink are aggregated, and a color material aggregate is formed. Because of this, color material flow on the recording medium P is prevented and an image is formed on the recording surface of the recording medium P.

The liquid droplet amount of the ink jetted from the inkjet heads 172M, 172K, 172C, and 172Y is preferably 1 to 10 pl (picoliters) and more preferably 1.5 to 6 pl from the standpoint of obtaining a high-definition image. Further, combining and jetting different liquid droplet amounts is also effective from the standpoint of improving image uniformity and continuous tone, and the present invention is suitably applied in this case also.

In the present example, a CMYK standard color (four-color) configuration is exemplified, but the combination of ink colors and the number of colors are not limited to those in the present embodiment, and light inks, dark inks, and special color inks may also be added as needed. For example, a configuration that adds inkjet heads that jet light inks such as light cyan and light magenta is also possible, and the order in which the color heads are arranged is also not particularly limited. The image drawing section 116 configured as described above performs image drawing in a single pass with respect to the recording medium P.

<Drying Section>

The recording medium P on which the image has been formed by the image drawing section 116 is transferred from the image drawing drum 170 via the intermediate conveyance section (second transfer cylinder conveying means) 128 to the drying drum 176 of the drying section 118. The intermediate conveyance section 128 uses holding claws (not shown in the drawings) to grip the leading end portion of the recording medium P received from the image drawing drum 170 and conveys the recording medium P in such a way that the recording surface of the recording medium P faces inward and in such a way that the reverse surface side has a convex shape along the guide member 129.

The intermediate conveyance section 128 may be given a configuration that has unillustrated hot air drying means (drying means) inside, blows hot air onto the recording surface side of the recording medium P facing inward during conveyance, and dries the ink that has been ejected onto the front surface. Because of this, the ink can be dried immediately after ink droplet ejection, so it becomes easier to reduce cockles in the recording medium P caused by the penetration of the ink and it becomes easier to deter the occurrence of suction wrinkles at the time of suction restraint on the drying drum 176 in the drying section 118.

The drying section 118 is a mechanism that dries the moisture included in the solvent that has been separated by the color material aggregating action, and the drying drum 176 and the hot air drying means 182, in which plural combinations of an IR heater or the like and a fan are placed in positions opposing the outer peripheral surface of the drying drum 176, are configured in the drying section 118.

Further, the air blowing means 180 (suction assisting means) is disposed on the upstream side (in the rotational direction of the drying drum 176) of the plural hot air drying means 182 in such a way as to oppose the outer periphery of the drying drum 176, and humidity controlling means 80 that controls the humidity inside the drying section 118 and a humidity sensor (not shown in the drawings) are also disposed in such a way as to oppose the outer periphery of the drying drum 176.

Like the process liquid drum 154, the drying drum 176 is equipped with claw-shaped holding means (grippers) 177 on its outer peripheral surface and can use the holding means 177 to hold the leading end of the recording medium P. Further, the drying drum 176 has plural suction holes in its outer peripheral surface, uses negative pressure to suck and tightly restrain the recording medium P onto the outer peripheral surface of the drying drum 176, and conveys the recording medium P. Hot air is applied from the hot air blowing nozzles of the hot air drying means 182 to the recording medium P restrained on the drying drum 176 in this way, whereby the recording medium P is dried.

Because of this, the occurrence of cockles in the recording medium P is prevented. Further, by bringing the recording medium P into tight contact with the outer peripheral surface of the drying drum 176, the occurrence of jams and paper sheet burns caused by the recording medium P contacting the hot air drying means 182 can be prevented.

The hot air blowing nozzles of the hot air drying means 182 are configured to blow warm air controlled at a predetermined temperature toward the recording medium P with a fixed air volume, and the IR heaters are each controlled to a predetermined temperature. The moisture included in the recording surface of the recording medium P held on the drying drum 176 is evaporated and a drying treatment is performed by these hot air blowing nozzles and IR heaters. At that time, the drying drum 176 of the drying section 118 is structurally separate from the image drawing drum 170 of the image drawing section 116, so non jetting of the ink caused by the drying of the head meniscus portions which may be caused by heat drying can be reduced in the inkjet heads 172M, 172K, 172C, and 172Y. Further, there is a degree of freedom in the temperature setting of the drying section 118, and an optimum drying temperature can be set.

It is preferred that the evaporated moisture be discharged to the outside of the apparatus together with the air by discharging means not shown in the drawings. Further, air that has been collected may also be cooled and the moisture is collected as a liquid by a cooler (radiator) or the like.

Further, it is preferred that the outer peripheral surface of the drying drum 176 be controlled to a predetermined temperature. By performing heating from the reverse surface of the recording medium P, drying is accelerated and image destruction at the time of fixing can be prevented.

The range of the surface temperature of the drying drum 176 is preferably equal to or greater than 50° C. and more preferably equal to or greater than 60° C. Further, the upper limit is not particularly limited but is preferably equal to or less than 75° C. from the standpoint of safety (preventing burn injuries caused by a high temperature) of maintenance work such as cleaning any ink adhering to the surface of the drying drum 176.

Further, it is preferred that the drying drum 176 be heated beforehand to the predetermined temperature before the recording medium P is conveyed thereto. By heating the drying drum 176 beforehand, drying can be accelerated, so image destruction can be prevented and cockles can be prevented. It is preferred that the temperature to which the drying drum 176 is heated be in the same temperature range as that of the surface temperature of the drying drum 176.

It is preferred that the drying drum 176 be heated such that the drying drum 176 is achieved at the predetermined temperature in a state in which the recording medium P is sucked onto the drying drum 176 in order to prevent a drop in temperature when the recording medium P is sucked onto the drying drum 176. Further, in a case where heating is performed without the recording medium P being sucked onto the drying drum 176, it is preferred that the drying drum 176 be heated to a higher temperature than the predetermined temperature in consideration of a drop in temperature when the recording medium P is sucked onto the drying drum 176. Further, the drying drum 176 dries the recording medium P while holding and rotationally conveying the recording medium P in such a way that the recording surface of the recording medium P faces outward (that is, in a state in which the recording medium P is curved such that the recording surface of the recording medium P becomes the convex side), whereby the occurrence of wrinkles in and floating of the recording medium P can be prevented and drying unevenness causes by these can be reliably prevented.

Further, the air blowing means 180 (suction assisting means) disposed on the upstream side of the hot air drying means 182 is for assisting the suction of the recording medium P onto the drying drum 176. The air blowing means 180 blows air in an oblique direction toward the trailing end side of the recording medium P and performs control in such a way as to apply the air obliquely toward the width direction end portion sides of the recording medium P so that the force of the air becomes greater at the trailing end. Because of this, floating of the paper sheet at the trailing end of the recording medium P is prevented, suction wrinkles in the recording medium P are removed, and uniform drying and uniform suction are made possible. In this way, by using the air blowing means 180 that is suction assisting means not in contact with the recording medium P, the occurrence of image defects of the recording medium P can be prevented even if the recording medium P includes the ink that has not yet dried and is transferred to the contacting means.

The suction force of the drying drum 176 can be expressed by: (aperture area)×(pressure per unit area). The suction force can be increased by increasing the area occupied by the suction holes in the recording medium suction holding region—that is, the aperture ratio.

Further, it is preferred that the aperture ratio of the suction holes disposed in the outer peripheral surface of the drying drum 176 be equal to or greater than 1% and equal to or less than 75% of the area of contact between the outer peripheral surface of the drying drum 176 and the recording medium P. This is because when the aperture ratio is less than 1%, expansion deformation of the recording medium P caused by water absorption after recording cannot be sufficiently deterred and the drying drum 176 itself is also warmed and drying is accelerated as a result of the recording medium P contacting the drying drum 176, and when the aperture ratio exceeds 75%, the area of contact between the reverse surface of the recording medium P and the outer peripheral surface of the drying drum 176 becomes lower, so sufficient drying performance cannot be obtained even in a state in which the recording medium P is sucked and held, and there is the concern that cockles will also become worse.

Consequently, by making the aperture ratio of the suction holes in the outer peripheral surface of the drying drum 176 equal to or greater than 1% and equal to or less than 75%, cockles can be suppressed and prevented and drying performance can be improved.

The aperture ratio is set depending on the diameter of the suction holes, the hole pitch, and the shape and arrangement of the holes. It is preferred that the hole diameter is designed to be equal to or greater than 0.4 mm—and equal to or less than 1.5 mm so that depression marks (suction marks) in the recording medium P caused by negative pressure suction do not appear. It is preferred that the hole pitch be equal to or greater than 0.1 mm and equal to or less than 5 mm in order to prevent thermal deformation of the outer peripheral surface of the drying drum 176 and ensure rigidity. This is because when the holes are spaced too far apart, the effect of deterring deformation of the recording medium is inadequate and the occurrence of wrinkles cannot be suppressed that much. Further, it is preferred that the suction holes have shapes with rounded corner portions, because if the suction holes have angles (sharp angles), stress concentrates in the corner portions.

Further, in a rotational conveyance body, the amount of deformation of the recording medium P caused by suction pressure becomes greater in the axial direction than in the circumferential direction. Consequently, by giving the suction holes an oval shape or long hole shape that takes the circumferential direction as its major axis direction and the axial direction as its minor axis direction, deformation in the circumferential direction and deformation in the axial direction of the recording medium P can be made equal.

Further, by holding, rotationally conveying, and drying the recording medium P on the outer peripheral surface of the drying drum 176 such that the recording surface of the recording medium P faces outward (that is, in a state in which the recording medium P is curved in such that the recording surface of the recording medium P becomes the convex side), the occurrence of wrinkles in and floating of the recording medium P can be prevented and drying unevenness causes by these can be reliably prevented.

It is also possible to control the humidity by controlling the drying conditions resulting from the hot air drying means 182, but in the present embodiment, the humidity controlling means 80 that controls the humidity is further disposed inside the drying section 118. The humidity controlling means 80 controls the humidity in such a way that the amount of moisture (described later) included in the recording medium P falls within a desired range and in such a way as to not over-dry the recording medium P inside the drying section 118 and in such a way that the moisture does not become excessive.

Specifically, the humidity controlling means 80 may be configured by appropriately combining humidifying means and drying means; the humidifying means and the drying means are not particularly limited, and the humidifying means may be configured by using a generally used steam humidifier, fan humidifier, or ultrasonic humidifier, and an electric dryer or the like may be used as the drying means.

Further, as described later, a paper moisture meter 181 that measures the amount of moisture on a surface of the recording side of the recording medium P fixed by ultraviolet light is disposed inside the fixing section 120. The amount of moisture in the recording medium P before ink jetting is the sum of the moisture included in the recording medium P from the start and the moisture included in the process liquid applied by the process liquid application section 114. Ink droplets are jetted by the inkjet heads 172 in the image drawing section 116 on top of this, and the amount of moisture included in the ink droplets is added to the above-described amount of moisture, whereby the amount of moisture in the recording medium P conveyed to the drying section 118 is decided. The paper moisture meter 181 measures the amount of moisture on the surface on the recording side of the recording medium P, and the humidity controlling means 80 controls the humidity inside the drying section 118 in such a way that, at the time of fixing with the ultraviolet light in the fixing section 120, the difference between this value and the amount of moisture on the surface on the recording side included in the recording medium P at the start as measured by the moisture meter 113 disposed inside the feed section 112 is equal to or greater than 2 g/m² and equal to or less than 5 g/m². It is preferred that this control be performed by printing a test image at the time the apparatus is started up or by continuously checking the paper moisture meter at the time of the operation and automatically controlling the humidity controlling means 80 on the basis of that result.

Further, instead of actually measuring the amounts of moisture with the paper moisture meter 181 and the paper moisture meter 113 disposed inside the feed section 112, the difference between the amounts of moisture on the surface of the recording medium P may also be calculated from conditions such as the type of the recording medium P, the amount of process liquid applied to the recording medium P by the process liquid application device 156, and the amount of ink jetted onto the recording medium P by the inkjet heads 172.

(Fixing Section>

The recording medium P on which the drying treatment has been performed by the drying section 118 is transferred from the drying drum 176 via the intermediate conveyance section (third transfer cylinder conveying means) 130 to the fixing drum 184 of the fixing section 120.

When the fixing drum 184 receives the recording medium P from the intermediate conveyance section 130, the fixing drum 184 uses the holding means 185 disposed on the outer peripheral surface of the fixing drum 184 to hold the leading end portion of the recording medium P, wraps the recording medium P onto the outer peripheral surface of the fixing drum 184, and conveys the recording medium P.

The pressure roller (smoothing means) 188 that is placed so as to oppose the fixing drum 184 applies pressure to the recording medium P that is wrapped onto the outer peripheral surface of the fixing drum 174 and conveyed, whereby the recording medium P is pressed against the fixing drum 184 so that curls are corrected and wrinkles are removed.

The pressure roller 188 is placed in such a way as to be in pressure contact with the fixing drum 184 and configures a nip roller with the fixing drum 184. Because of this, the recording medium P is sandwiched between the pressure roller 188 and the fixing drum 184 and is nipped with a predetermined nip pressure (e.g., 0.15 MPa), and a smoothing treatment is performed.

Further, the pressure roller 188 may also be a heat roller. For example, the pressure roller 188 may also be configured as a heat roller in which a halogen lamp is incorporated inside a metal pipe having good thermal conductivity such as aluminum. The recording medium P is heated and pressed by the pressure roller 188, whereby thermal energy equal to or greater than the Tg temperature (glass transition temperature) of the latex included in the ink is applied, the latex particles are fused, unevenness in the image surface of the recording medium P is leveled, and glossiness is obtained.

A radiation thermometer 183 that measures the surface temperature of the recording medium P is disposed inside the drying section 118. The radiation thermometer 183 measures, without contacting the recording medium P, the surface temperature of the recording medium P onto which the ultraviolet-curable ink has been jetted and sends the measured surface temperature as surface temperature data to an unillustrated controller. The controller controls, for example, the temperature of the pressure roller 188 in accordance with the surface temperature from the data to thereby control the temperature of the surface of the recording medium P to an optimum temperature. Alternatively, an IR heater or the like may also be disposed in the neighborhood of the conveyance surface of the recording medium P instead of the pressure roller 188.

Next, the recording medium P is subjected to irradiation with ultraviolet light by the ultraviolet light sources 190 that are placed so as to oppose the fixing drum 194, and curing/fixing is performed. Here, a plurality of the ultraviolet light sources 190 may be used. Because of this, it becomes possible to achieve the curing conditions by the irradiation time and reduce the irradiation intensity of each of the ultraviolet light sources 190, and a reduction in cost and a reduction in the amount of heat emitted by the ultraviolet light sources 190 can be achieved. Further, the paper moisture meter 181 is disposed on the conveyance direction upstream side of the ultraviolet light sources 190, and as mentioned before, the amount of moisture in the recording medium P at this time is controlled in such a way that the difference between the amounts of moisture on the surface on the recording side included at the start and at this point is equal to or greater than 2 $g/m^2$ and equal to or less than 5 $g/m^2$.

The ultraviolet light sources 190 are not particularly limited; for example, metal halide lamps, mercury lamps, excimer lasers, ultraviolet lasers, black lights, cold-cathode tubes, LEDs, and laser diodes, can be applied, and metal halide lamp tubes, mercury lamp tubes, or black lights are suitably used. More preferably, light-emitting diodes that emit ultraviolet light with an emission wavelength peak of 350 to 420 nm and whose highest illuminance on the surface of the recording medium is 10 to 2000 $mW/cm^2$ are suitably used.

The peak wavelength of the ultraviolet light applied by the ultraviolet light sources 190 depends also on the absorption characteristics of the ink composition, but it is preferably 200 to 600 nm, more preferably 300 to 450 nm, and even more preferably 350 to 450 nm.

The irradiation energy of the ultraviolet light sources 190 is preferably equal to or less than 2000 $mJ/cm^2$, more preferably 10 to 2000 $mJ/cm^2$, and even more preferably 800 to 2000 $mJ/cm^2$.

Further, in the inkjet recording apparatus of the present invention, it is suitable that the ultraviolet light be applied to the recording surface of the recording medium preferably for 0.01 to 10 seconds and more preferably for 0.1 to 2 seconds.

A plurality of the ultraviolet light sources 190, which are ultraviolet light applying means, may be disposed. Because of this, it becomes possible to reduce the irradiation intensity of each of the ultraviolet light sources 190 and realize the curing conditions with the sum of the irradiation time of the plural ultraviolet light sources, and effects such as a reduction in cost and a reduction in the amount of heat emitted by the ultraviolet light sources 190 can be expected.

<Relationship between Optimum Ultraviolet Intensity per Amount of Ink Jetted and Amount of Moisture in Recording Medium>

FIG. 4A and FIG. 4B (Table 1) are adhesion evaluation results in regard to ink after fixing in cases where the UV dose and the amount of moisture in the recording medium P before the fixing step have been varied.

There is the concern that when the aqueous ultraviolet-curable ink is cured with ultraviolet light, ultraviolet curing will become insufficient and the film strength of the ink section will end up being inadequate if the amount of moisture included in the recording medium is too low. In low-density jetting (2.4 to 3.0 pl) conditions in which the amount of radicals generated is relatively large and the liquid droplet volume is small, it is estimated that the greater the difference is between the amount of moisture on the surface on the recording side of the recording medium P and the amount of moisture included at the start of recording operation, the smaller the effect of oxygen polymerization inhibition is or the larger the radical mobility is, so the ink is cured efficiently in a range where the UV dose is small and the adhesion evaluation becomes "Good".

On the other hand, in high-density jetting (4.0 to 5.0 pl) conditions in which the amount of radicals generated is relatively small and the liquid droplet volume is large, it is estimated that the smaller the difference is between the amounts of moisture, the denser the double bond density becomes, so results in which the ink is cured efficiently in a range where the UV dose is small and in which the adhesion evaluation is "Good" were obtained.

From these facts, when the preferred UV dose is equal to or greater than 800 $mJ/cm^2$ in the entire range of the liquid droplet volume of 2.4 to 5.0 pl, in order to obtain the adhesion evaluation "Good", the range of the difference between the amounts of moisture is 2 to 5 $g/cm^2$. There is obtained the knowledge that the ink is not sufficiently cured in the low-density jetting range of the printing portion in a case where the difference between the amounts of moisture is less than 2 $g/cm^2$ and the ink is not sufficiently cured in the high-density jetting range of the printing portion in a case where the difference between the amounts of moisture is greater than 5 $g/cm^2$. The experimental conditions and method are described below.

Resin-coated Magenta Pigment Dispersion (M)

10 parts of pigment blue 15:3 (Chromophthal Jet Magenta DMQ (pigment red 122, made by Chiba Japan)), 5 parts of the above-described polymer dispersant P-1, 42 parts of methyl ethyl ketone, 5.5 parts of 1 mol/L NaOH aqueous solution, and 87.2 parts of ion exchange water were mixed together and dispersed for 2 to 6 hours with a bead mill using 0.1 mmϕ zirconia beads.

The methyl ethyl ketone was removed at 55° C. under reduced pressure from the obtained dispersion and some of the water was also removed, whereby a resin-coated magenta pigment dispersion (colored particles) (M) having a pigment concentration of 10.2% by mass was obtained.

Magenta Ink:

| | |
|---|---|
| Resin-coated magenta pigment dispersion (M) | 6% (solid concentration) |
| Polymerization initiator | 3% |
| NK ester | 20% |
| Olefin E1010 (made by Nissin Chemical Co, Ltd.; surfactant) | 1% |
| Urea (Nissan Chemical Industries, Ltd.) | 3% |
| Ion exchange water | remaining amount (added to reach 100% by mass in total mass) |

Process Liquid:

| | |
|---|---|
| Malonic acid (made by Tateyama Kasei Co., Ltd.; acidic compound) | 25.0% |
| Tripropylene glycol monomethyl ether (water-soluble organic solvent) | 5% |
| Ion exchange water | remaining amount (added to reach 100% by mass in total mass) |

As the recording medium (coated paper), OK top coat+ (grammage of 104.7 g/m²) was prepared, images were formed as described below, and the following evaluations were made in regard to the images that were formed.

As the ink composition, the above-described magenta ink was used to configure an ink set together with the process liquid, and line images and solid images were formed by four-color single pass recording by the method described below. First, as shown in FIG. 3, an inkjet apparatus in which a process liquid application section 12 that jets an aqueous process liquid, a process liquid drying zone 13 that dries the applied aqueous process liquid, an ink jetting section 14 that jets various types of aqueous ink, an ink drying zone 15 that dries the jetted aqueous inks, and a UV irradiation section 16 equipped with a UV irradiation lamp 16S capable of applying ultraviolet (UV) light are disposed sequentially in the conveyance direction of the recording medium (the direction of the arrows in the drawing) was prepared.

The process liquid drying zone 13 has on the recording surface side of the recording medium an air blower (not shown in the drawings) that performs drying by blowing dry air, has on the non-recording surface side of the recording medium an infrared heater (not shown in the drawings), and is configured in such a way that it can control the temperature and air volume to evaporate (dry) 70% by mass or more of the water in the aqueous process liquid by the time 900 milliseconds elapse after the application of the process liquid has been started by the process liquid application section.

Further, in the ink jetting section 14, a black ink jetting head 30K, a cyan ink jetting head 30C, a magenta ink jetting head 30M, and a yellow ink jetting head 30Y are sequentially placed in the conveyance direction (the direction of the arrows), and each head is a 1200-dpi/20-inch width full-line head. The heads can record images of each color by jetting ink in the main scanning direction in a single pass.

Figure 3:
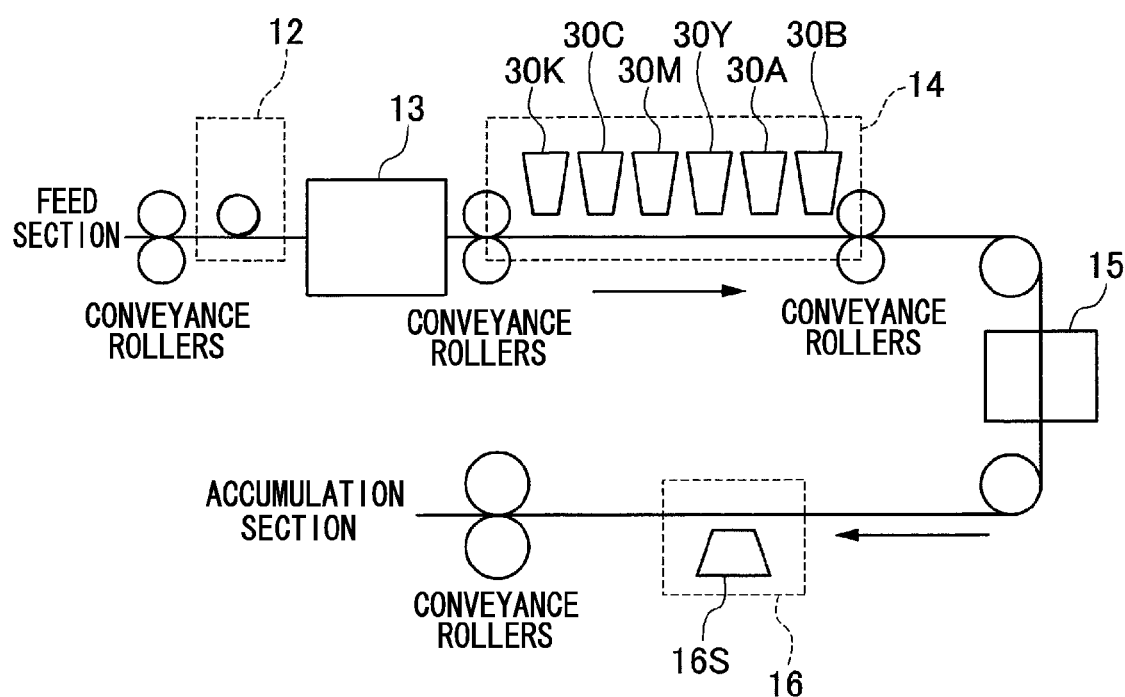
FIG. 3 is a conceptual diagram showing an experimental apparatus for investigating the relationship between amounts of moisture in a recording medium and evaluations of ink adhesion after fixing in an image recording method pertaining to the embodiment of the present invention.

In the present experiment, storage tanks (not shown in the drawings) were connected to the ink jetting heads of the inkjet apparatus configured as shown in FIG. 3, and were filled with the ink obtained as described above, and solid images and 1200 dpi line images were recorded on the recording medium.

The line images were obtained by jetting ink in the main scanning direction in a single pass to record a 1200-dpi line that was one dot in width, a 1200-dpi line that was two dots in width, and a 1200-dpi line that was four dots in width, and the solid images were obtained by jetting ink onto the entire surfaces of samples obtained by cutting the recording medium into A-5 sizes. The conditions during recording were as follows.

1. Process Liquid Applying Step

A roll coater whose coating amount was controlled by an anilox roller (number of lines: 100 to 300 per inch) was used to apply the process liquid to the entire surface of the recording medium in such a way that the applied amount became 1.4 g/m².

2. Treatment Step

Next, a drying treatment and a penetration treatment were administered under the following conditions to the recording medium to which the process liquid was applied.

Air Speed: 10 m/s

Temperature: the recording medium was heated with a contact flat heater from the opposite side (back surface side) of the recording surface of the recording medium such that the surface temperature on the recording surface side of the recording medium became 60° C.

3. Ink Applying Step

Thereafter, a line image and a solid image were formed by jetting the ink composition by the inkjet method under the following conditions onto the coated surface of the recording medium to which the process liquid was applied.

Heads: four color 1200-dpi/20-inch width piezo full-line heads were placed

Amount of Liquid Droplets Jetted: 2.4 to 5.0 pL

Drive Frequency: 30 kHz

4 Ink Drying Step

Next, the recording medium to which the ink composition was applied was dried with hot air from the opposite side (back surface side) of the recording surface of the recording medium in such a way that the amount of moisture on the surface on the recording surface side of the recording medium was at 1.0 to 7.0 g/m² greater than the amount of moisture included at the start, as measured by a Karl Fischer titrator.

5. UV Exposure Step

After image drying, in the UV irradiation section 16, UV light (a metal halide lamp made by Eye Graphics Co., Ltd. and having a maximum irradiation wavelength of 365 mm) was applied in such a way that the integrated dose became 100 to 1500 mJ/cm², and the image was cured.

6. Curing Sensitivity Evaluation

Cellophane tape was adhered to the printed image surface of the evaluation sample on which the solid image was formed, and the adhesive surface of the cellophane tape and the printed image surface after the cellophane tape was slowly peeled away were visually observed and evaluated in accordance with the following evaluation criteria.

The evaluation criteria were as follows.

Excellent . . . No detachment of the image (color material) could be seen in the printed image surface.

Good . . . Slight detachment of the image (color material) was recognized in the printed image surface but was not a practical problem.

Poor . . . Detachment of the image (color material) could be seen in the printed image surface and was of a level that became a practical problem.

NG . . . Large detachment of the image (color material) could be seen in the printed image surface.

<Effects>

As mentioned before, in the process of the present embodiment using aqueous ultraviolet-curable ink, by controlling the difference between the amounts of moisture in the recording medium P to be equal to or greater than 2 g/m$^2$ and equal to or less than 5 g/m$^2$ in the drying section 118, the film strength of the ink (adhesion evaluation result) can be kept to a level without practical problems in the wide range of the jetted liquid amount of 2.4 pl to 5.0 pl.

<Conclusion>

As described above, in the present embodiment, the inkjet recording method includes a feeding step of feeding a recording medium, a jetting step of jetting aqueous ultraviolet-curable ink onto the recording medium, a humidity controlling step of controlling the amount of moisture on the surface on the recording side of the recording medium after the jetting step in such a way that the difference between the amount of moisture on the surface on the recording side after the jetting step and the amount of moisture on the surface on the recording side during the feeding step is equal to or greater than 2 g/m$^2$ and equal to or less than 5 g/m$^2$, and a fixing step of curing and fixing, with a dose of ultraviolet light equal to or greater than 800 mJ/cm$^2$, the aqueous ultraviolet-curable ink on the recording medium in which the amounts of moisture has been controlled, so there can be provided an inkjet recording method that manages the amount of moisture in a recording medium and reliably cures aqueous ultraviolet-curable ink.

<Other>

An embodiment of the present invention has been described above, but the present invention is in no way limited to the above-described embodiment and, it goes without saying, can be implemented in a variety of aspects without departing from the gist of the present invention.

For example, in the above-described embodiment, an inkjet recording method using aqueous ultraviolet-curable ink was taken as an example, but the embodiment of the present invention is not limited to this and may also, for example, be applied to other types of recording methods as long as the configuration needs to maintain the humidity of the recording medium at a constant.

The disclosure of Japanese Patent Application No. 2010-193854 is incorporated in its entirety in the present specification by reference. All publications, patent applications, and technical standards mentioned in the present specification are incorporated by reference in the present specification to the same extent as if each individual publication, patent application, or technical standard was specifically and individually indicated to be incorporated by reference.

What is claimed is:

1. An inkjet recording method comprising:
   a feeding step of feeding a recording medium;
   a jetting step of jetting aqueous ultraviolet-curable ink onto the recording medium;
   a humidity controlling step of controlling an amount of moisture on a surface on a recording side of the recording medium after the jetting step in such a way that a difference between the amounts of moisture on the surface on the recording side of the recording medium after the jetting step and during the feeding step is in a range from 2 g/m$^2$ to 5 g/m$^2$; and
   a fixing step of curing and fixing, with a dose of ultraviolet light equal to or greater than 800 mJ/cm$^2$, the aqueous ultraviolet-curable ink on the recording medium after the amount of moisture thereof has been controlled to be within the range.

2. The inkjet recording method according to claim 1, wherein in the feeding step and the humidity controlling step, a paper moisture meter is used to measure the amounts of moisture on the surface on the recording side of the recording medium and to calculate the difference between the amounts of moisture.

3. The inkjet recording method according to claim 1, further comprising a process liquid applying step before the jetting step, and a step of calculating the difference between the amounts of moisture on the basis of a type of the recording medium, an amount of process liquid applied to the recording medium, and an amount of ink jetted.

4. The inkjet recording method according to claim 1, wherein, in the fixing step, the ultraviolet light is applied to the recording medium after a temperature of the surface on the recording side of the recording medium, as measured by a radiation thermometer, has been controlled to a predetermined temperature range.

5. The inkjet recording method according to claim 1, wherein the aqueous ultraviolet-curable ink includes at least a color material, a polymerizable monomer that is polymerized by ultraviolet light, an initiator that initiates the polymerization of the polymerizable monomer by ultraviolet light, and 50% or more of water.

* * * * *